United States Patent [19]

Minnaar et al.

[11] 4,400,122
[45] Aug. 23, 1983

[54] EXPANSION BOLT

[75] Inventors: Daniel Minnaar; Clive Straughan, both of Johannesburg, South Africa

[73] Assignee: Coalequip (Proprietary) Limited, South Africa

[21] Appl. No.: 226,280

[22] Filed: Jan. 19, 1981

[51] Int. Cl.³ .............................................. F16B 13/06
[52] U.S. Cl. .......................................... 411/67; 411/33
[58] Field of Search .................... 411/32, 33, 44, 45, 411/47, 64, 67, 71, 72

[56] References Cited

U.S. PATENT DOCUMENTS

| 3,248,998 | 5/1966 | Siegel | 411/67 |
| 4,293,259 | 10/1981 | Liebig | 411/32 |
| 4,337,012 | 6/1982 | Sohnius | 411/3 |

FOREIGN PATENT DOCUMENTS

| 842512 | 5/1970 | Canada | 411/33 |
| 1434048 | 4/1976 | United Kingdom | 411/33 |

Primary Examiner—Robert L. Wolfe
Attorney, Agent, or Firm—Sughrue, Mion, Zinn, Macpeak & Seas

[57] ABSTRACT

The invention relates to an expansion bolt of a type having an expansible shell arranged on an elongated stud, with a tapered plug being provided to expand the shell in use. In order to render the bolt more versatile, a spacer is provided between the plug and the expansible shell, the spacer being in the form of finger elements which engage the inner surface of the shell to expand it.

7 Claims, 1 Drawing Figure

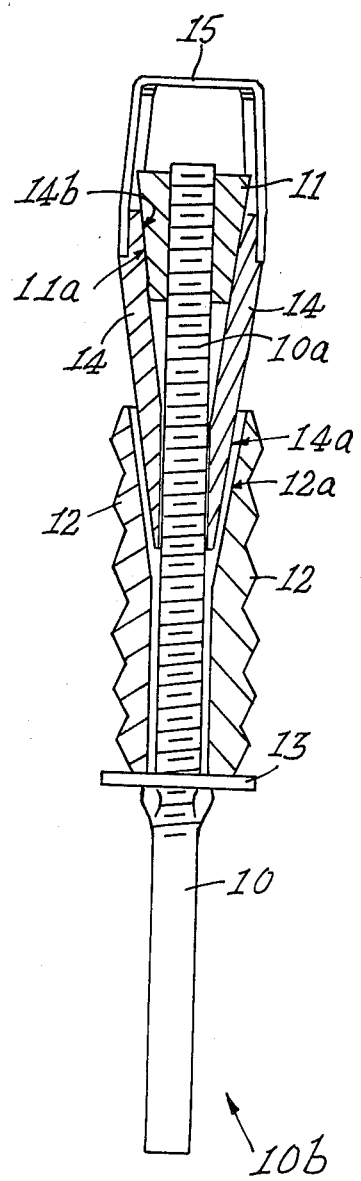

EXPANSION BOLT

This invention relates to an expansion bolt.

Conventional rock bolts of the expanding type include a threaded stud member having a complementary threaded conical plug element towards its one end, and an expansible shell formed of two or more leaves on the stud the shell being adapted to be expanded by the plug in use upon rotation of the stud. A problem associated with such bolts is that the degree of expansion of the shell is limited and the bolts cannot be used in oversize holes.

An object of the present invention is the provision of a novel expansion bolt which it is believed will be more versatile, from an expansion point of view than conventional bolts.

According to the invention an expansion bolt comprises an elongated stud member which is adapted to provide anchorage at its leading end in use, a plug element secured to the stud towards its remote trailing end, and expansible shell disposed on the stud adjacent the plug, and a spacer member disposed on the stud intermediate the shell and plug, the spacer being adapted to expand the shell radially.

Preferably the expansible shell will comprise two or more longitudinal leaf elements, with the spacer being adapted to engage the inner surfaces of all or selected leaves of the shell to expand such leaves radially. Preferably the spacer will comprise two or more longitudinal finger elements capable of being expanded radially by means of the plug. In a preferred arrangement the spacer will thus take the form of a second expansible shell arranged in tandem with the first shell. It is also within the scope of the invention to provide more than two expansible shells disposed in tandem, if desirable.

In a preferred arrangement the remote ends of the fingers of the spacer will be deformably coupled together by means of a uniting claw forming the remote extremity of the bolt. Alternatively, the fingers could be releasably bound to the stud by means of an encircling spring clip or the like. The leaves of the shell could be likewise bound together. Preferably the means for coupling the fingers of the spacer together will be sufficient strength to ensure that the leaves of the shell open radially in use prior to the fingers of the spacer.

It is further preferred that the surfaces of the leaves of the shell the fingers of the spacer, which mate in use, be substantially parallel. It is likewise preferred that the mating surfaces of the fingers and tapered plug be parallel.

In order to illustrate the invention, an example thereof is described hereunder with reference to the accompanying drawing which is a sectioned elevation of an expansion bolt.

Referring to the drawing, an expansion bolt comprises a shaft or stud 10 which is threaded at its remote trailing end 10(a), and in use provides an anchorage at its leading end 10(b). A tapered plug 11 which has a complementary threaded axial bore is screwed onto the threaded portion 10(a) of the stud 10. An expansible shell 12, which preferably comprises three longitudinal segments or leaves is also disposed on the threaded portion 10(a). In use, the shell 12 is prevented from moving towards the leading end of the stud 10 by means of a collar 13.

A spacer 14 is disposed co-axially on the stud 10 intermediate the plug 11 and the shell 12. As shown in the drawing, the spacer 14 engages the inner faces of the shell 12 and is adapted to expand it radially in use. Preferably the spacer 14 will also comprise three finger or leaf elements which are in turn adapted to be expanded radially by means of the plug 11. In the arrangement illustrated, spacer 14 is thus in the nature of a second expansible shell arranged in tandem with the first shell 12. In circumstances it is envisaged that more than two expansible shells could be provided on the stud 10.

Where the spacer 14 comprises finger elements, these are preferably held together in an expansible fashion by means of a uniting claw 15 of thin sheet material. Alternatively, a spring clip could be utilised to hold the fingers together. Preferably the leaves of the shell 12 will also be held together in releasable fashion by means of a spring clip (not shown). Preferably the uniting claw 15 or spring clip as the case may be will be of sufficient strength to ensure that the leaves of the shell 12 expand before the fingers expand.

For efficient operation, it is preferred that the outer surface 14(a) of the spacer 14 and the inner surface 12(a) of the shell 12 which mate in use be substantially parallel. It is likewise preferred that the inner surface 14(b) of the spacer 14 and the outer tapered surface 11(a) of the plug 11 be parallel.

Clearly many variations of the invention exist which differ in matters of detail only, but do not depart from the principles set out in the consistory clauses. For example, the outer surface of the shell 12 is illustrated as providing gripping formations and the exposed outer surface of the spacer 14 could likewise be provided with such gripping formations.

We claim:

1. An expansion bolt comprising an elongated stud member which is adapted to provide an anchorage at its leading end in use, a plug element secured to the stud towards its remote trailing end, an expansible shell on the stud, a spacer member disposed on the stud intermediate the shell and the plug, the spacer member being comprised of a plurality of elongated finger elements which are adapted to expand the shell radially upon movement of the plug towards the shell and deformable means coupling the ends of the finger elements adjacent the plug element together, said deformable means having sufficient strength to ensure the expansion of said shell prior to the radial expansion of said finger elements of said spacer.

2. The expansion bolt according to claim 1 wherein the expansible shell comprises two or more longitudinal leaf elements.

3. The expansion bolt according to claim 2 wherein the spacer is adapted to engage the inner surfaces of at least some of said leaves of the shell to expand such leaves radially.

4. The expansion bolt according to claim 1 wherein the remote ends of the finger elements are deformably coupled together by means of a uniting claw forming the remote extremity of the bolt.

5. The expansion bolt according to claim 1 wherein the finger elements are releasably bound to the stud by means of an encircling spring clip.

6. The expansion bolt according to claim 3 wherein the inner surfaces of the leaves of the shell and the outer surfaces of the spacer fingers, which mate in use, are substantially parallel.

7. The expansion bolt according to claim 1 wherein the inner surface of the fingers of the spacer and the outer surface of the plug are substantially parrallel.

* * * * *